United States Patent
Chen

(10) Patent No.: US 11,523,450 B2
(45) Date of Patent: Dec. 6, 2022

(54) METHOD AND ELECTRONIC DEVICE FOR INFORMATION PROCESSING

(71) Applicant: Lenovo (Beijing) Co., Ltd., Beijing (CN)

(72) Inventor: Xiaodong Chen, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 148 days.

(21) Appl. No.: 16/943,931

(22) Filed: Jul. 30, 2020

(65) Prior Publication Data
US 2021/0037580 A1     Feb. 4, 2021

(30) Foreign Application Priority Data

Jul. 31, 2019   (CN) .......................... 201910703011.9

(51) Int. Cl.
*H04L 12/28*     (2006.01)
*H04W 76/14*     (2018.01)
*H04W 4/02*     (2018.01)
*H04W 84/04*     (2009.01)

(52) U.S. Cl.
CPC ........... *H04W 76/14* (2018.02); *H04W 4/023* (2013.01); *H04W 84/042* (2013.01)

(58) Field of Classification Search
CPC ......... H04L 41/12; H04L 45/02; H04L 45/00; H04L 45/04; H04L 63/0492; H04L 63/0884; H04L 63/107; H04W 84/18; H04W 76/14; H04W 4/023; H04W 84/042; H04W 4/80; H04W 12/084; H04W 88/04; H04W 4/021; H04W 4/70
See application file for complete search history.

(56) References Cited

U.S. PATENT DOCUMENTS

| | | | | |
|---|---|---|---|---|
| 8,621,056 | B2* | 12/2013 | Coussemaeker | H04W 12/08 709/223 |
| 9,699,594 | B2* | 7/2017 | Sarkar | H04W 12/35 |
| 2008/0171561 | A1* | 7/2008 | Irony | H04W 76/15 455/466 |
| 2012/0040665 | A1* | 2/2012 | Liu | H04M 1/72463 455/426.1 |
| 2012/0099566 | A1* | 4/2012 | Laine | H04M 1/72412 455/41.1 |
| 2012/0294293 | A1* | 11/2012 | Kahn | H04W 48/14 370/338 |

(Continued)

FOREIGN PATENT DOCUMENTS

| | | |
|---|---|---|
| CN | 104869558 A | 8/2015 |
| CN | 106954217 A | 7/2017 |

(Continued)

*Primary Examiner* — Phuongchau Ba Nguyen
(74) *Attorney, Agent, or Firm* — Anova Law Group, PLLC

(57) ABSTRACT

An information processing method includes establishing, in response to a distance between a first electronic device and a second electronic device being less than a distance value, a communication connection between a first communication assembly of the first electronic device and a second communication assembly of the second electronic device; obtaining, by the first electronic device, information of the second electronic device through the first communication assembly and the second communication assembly; and connecting the first electronic device to a network based on the information.

17 Claims, 4 Drawing Sheets

(56) References Cited

U.S. PATENT DOCUMENTS

| | | | | |
|---|---|---|---|---|
| 2014/0127992 | A1* | 5/2014 | Kuscher | H04W 4/80 455/41.1 |
| 2014/0161113 | A1* | 6/2014 | Cui | H04W 12/06 370/338 |
| 2014/0269531 | A1* | 9/2014 | Luna | H04W 72/00 370/329 |
| 2017/0070346 | A1* | 3/2017 | Lombardi | H04W 12/06 |
| 2018/0110080 | A1* | 4/2018 | Pan | H04W 48/18 |
| 2018/0288765 | A1* | 10/2018 | Chrisikos | H04W 36/14 |
| 2019/0116488 | A1* | 4/2019 | Kumar | H04W 4/24 |
| 2019/0356176 | A1* | 11/2019 | Lee | H04W 4/80 |
| 2021/0314740 | A1* | 10/2021 | Richter | H04W 4/10 |

FOREIGN PATENT DOCUMENTS

| | | | | |
|---|---|---|---|---|
| EP | 2677773 | A1 * | 12/2013 | H04L 67/2819 |
| EP | 2901764 | B1 * | 10/2020 | H04W 4/70 |

\* cited by examiner

METHOD AND ELECTRONIC DEVICE FOR INFORMATION PROCESSING

CROSS-REFERENCE TO RELATED APPLICATION

The present disclosure claims the priority of Chinese Patent Application No. 201910703011.9, filed with the State Intellectual Property Office of P. R. China on Jul. 31, 2019, the entire content of which is incorporated herein by reference.

TECHNICAL FIELD

The present disclosure relates to the field of information processing and, in particular, to a method and an electronic device for information processing.

BACKGROUND

As the Internet becomes more and more popular, costs for accessing Internet are getting lower, and more electronic devices are able to access Internet. How to use the data flow of one electronic device to realize a mobile network accessible by multiple electronic devices, such as using data flow of a mobile phone to realize a mobile network accessible by the mobile phone and a laptop device, has become a technical problem that needs to be addressed.

SUMMARY

In accordance with the disclosure, one aspect of the present disclosure provides an information processing method. The method includes establishing, in response to a distance between a first electronic device and a second electronic device being less than a distance value, a communication connection between a first communication assembly of the first electronic device and a second communication assembly of the second electronic device; obtaining, by the first electronic device, information of the second electronic device through the first communication assembly and the second communication assembly; and connecting the first electronic device to a network based on the information.

Also, in accordance with the disclosure, another aspect of the present disclosure provides an electronic device. The electronic device includes a first communication assembly and a processor. The processor is configured to establish, in response to a distance between the electronic device and another electronic device being less than a distance value, a communication connection between the first communication assembly of the electronic device and the second communication assembly of the another electronic device. The processor is further configured to obtain, through the first communication assembly and the second communication assembly, information of the another electronic device. The processor is further configured to connect the electronic device to a network based on the information.

DESCRIPTION OF THE DRAWINGS

Drawings of some embodiments of the present disclosure are briefly described below. The drawings described below are only some embodiments of the present disclosure, and those skilled in the art can obtain other drawings according to the provided drawings without any creative work.

DETAILED DESCRIPTION

The technical solutions in the embodiments of the present disclosure are described in the following with reference to the drawings in the embodiments of the present disclosure. The described embodiments are only a part of the embodiments of the present disclosure, and not all of the embodiments. All other embodiments obtained by a person of ordinary skill in the art based on the embodiments of the present disclosure without departing from the inventive scope shall fall in the scope of the present disclosure.

The following describes some embodiments of the present disclosure. Those skilled in the art should understand that the features described in embodiments and/or claims of the present disclosure can be combined in various manners. Various combinations of features described in various embodiments and/or claims of the present disclosure may be made without departing from the spirit and teaching of the present disclosure. The present disclosure should not be limited by the described embodiments of the present disclosure.

As mentioned in the background section above, how to use the data flow of one electronic device to realize a mobile network accessible by multiple electronic devices has become a technical problem that needs to be addressed.

At present, electronic devices that support wireless wide area network (WWAN) long-term evolution (LTE) can realize a mobile network for each electronic device by inserting a subscriber identity assembly (SIM) card into each electronic device and configuring an access point name (APN) for each electronic device. For example, for an mobile phone and a laptop that support WWAN LTE, a mobile network accessible by the mobile phone and the laptop can be realized by inserting a SIM card into the mobile phone and the laptop and configuring an APN for the mobile phone and the laptop, respectively. However, this method requires configuring SIM cards for different electronic devices, and thus increases the cost for mobile network.

An electronic device that does not support WWAN LTE may be connected to a mobile network by connecting to a hotspot of another electronic device that has data flow. For example, a laptop that does not support WWAN LTE may be connected to a mobile network by connecting to a hotspot of a mobile phone. However, each time to realize the connection to the mobile network, the mobile phone needs to turn on the hotspot of the mobile phone, and the laptop needs to search for the hotspot of the mobile phone, and the operation is cumbersome.

Figure 1:
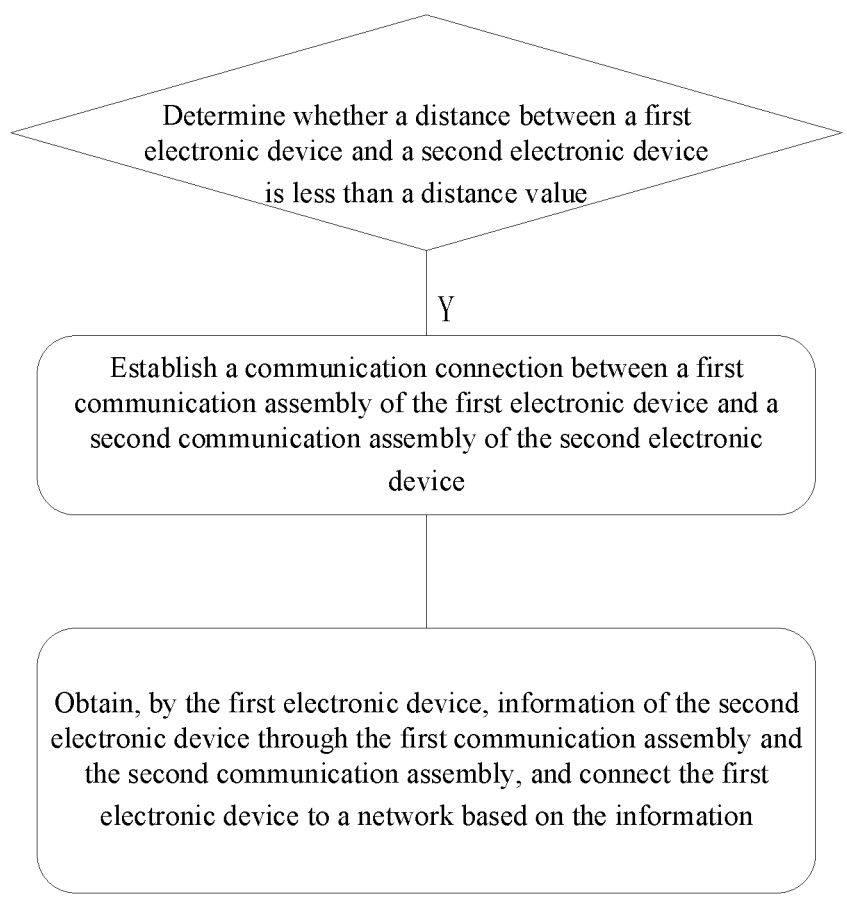
FIG. 1 is a flowchart of an information processing method according to some embodiments of the present disclosure.

In view of the above, some embodiments of the present disclosure provides an information processing method. As shown in FIG. 1, the information processing method includes the following.

If a distance between a first electronic device and a second electronic device is less than a first distance, a first communication assembly of the first electronic device and a second communication assembly of the second electronic device establish a communication connection. The first electronic device obtains first information of the second electronic device through the first communication assembly of the first electronic device and the second communication assembly of the second electronic device, and the first information is used by the first electronic device for connecting to the mobile network.

The first distance may be determined according to capability of establishing the connection between the first communication assembly of the first electronic device and the second communication assembly of the second electronic device. The present disclosure does not limit a value of the first distance. When the distance between the first electronic device and the second electronic device is less than the first distance, the first communication assembly of the first electronic device and the second communication assembly of the second electronic device establish a communication connection.

In some embodiments of the present disclosure, the second electronic device supports WWAN LTE and has data flow to realize network connection. In some embodiments, the second electronic device is externally inserted with a SIM card, and connects to a network by paying for Internet access charges of the SIM card.

In some embodiments of the present disclosure, the first electronic device may be a laptop, and the second electronic device may be a mobile phone. In some other embodiments, both the first electronic device and the second electronic device may be laptops, mobile phones, or other electronic devices with networking requirements. The second electronic device has data flow, but the present disclosure does not limit herein.

Current electronic devices usually support a near-field communication (NFC) function. In some embodiments, the first electronic device may have an NFC assembly and the second electronic device may have an NFC assembly. The first NFC assembly may be the NFC assembly of the first electronic device and the second NFC assembly may be the NFC of the second electronic device. If a distance between a first electronic device and a second electronic device is less than a first distance, the NFC assembly of the first electronic device and the NFC assembly of the second electronic device establish a communication connection. The first electronic device obtains first information of the second electronic device through the NFC assembly of the first electronic device and the NFC assembly of the second electronic device, and the first information is used by the first electronic device for connecting to the mobile network.

Figure 2:
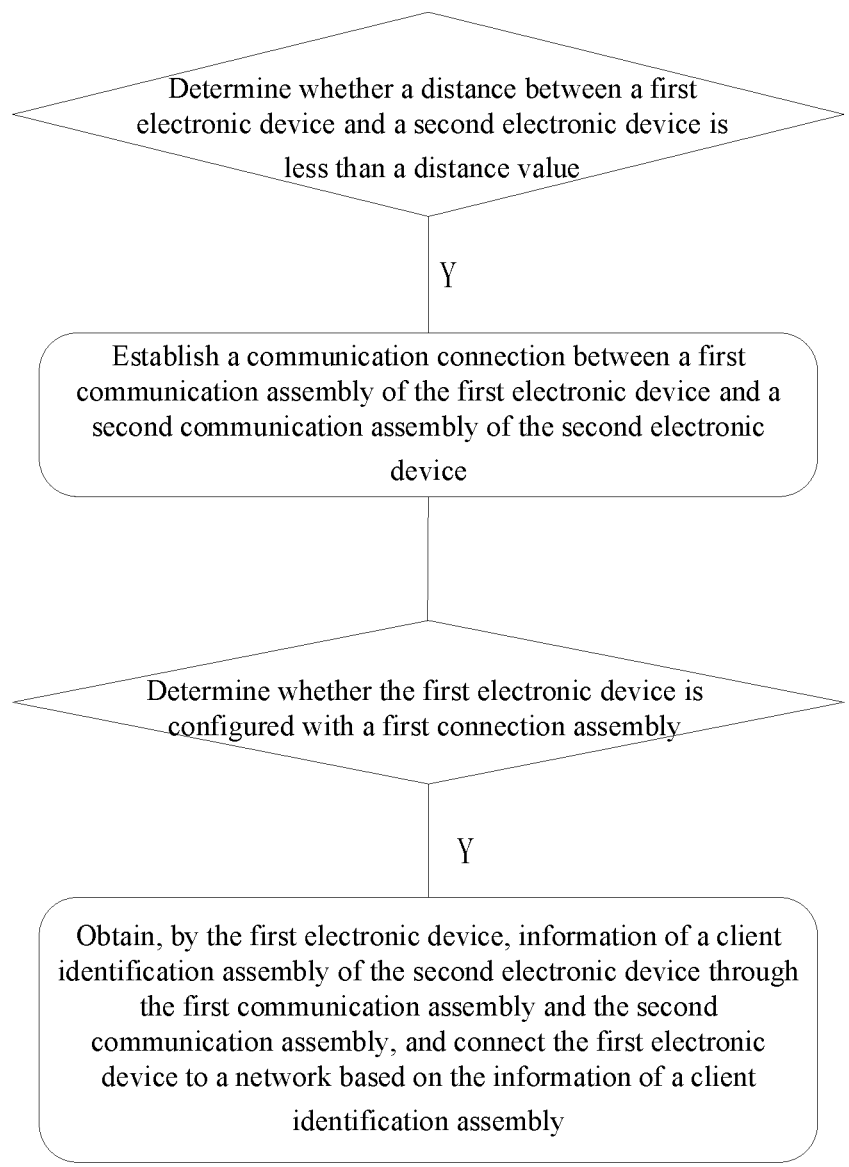
FIG. 2 is a flowchart of an information processing method according to some other embodiments of the present disclosure.

In some embodiments, as shown in FIG. 2, if the first electronic device has a first connection assembly, the first information is information of a client identification assembly of the second electronic device. The first connection assembly of the first electronic device enables the first electronic device to have the ability to connect the first electronic device to the mobile network within the coverage of a cellular network.

In some embodiments, the information of the client identification assembly of the second electronic device is the SIM card information of the second electronic device, which is not limited in the present disclosure. In some other embodiments of the present disclosure, if the second electronic device can also obtain data flow in other manners, the information of the client identification assembly of the second electronic device may be other information, which is not limited by the present disclosure. To simplify the description of the present disclosure, the information processing method provided by the present disclosure is described below, taking the SIM card information of the second electronic device as the client identification assembly information of the second electronic device.

In some embodiments of the present disclosure, the first connection assembly is the WWAN assembly of the first electronic device, which is not limited by the present disclosure. In other embodiments of the present disclosure, the first connection assembly may also be another assembly of the first electronic device. The first connection assembly of the first electronic device can enable the first electronic device to establish a network connection based on the information of the client identification assembly of the second electronic device.

In some embodiments of the present disclosure, the method further includes the following. The first connection assembly of the first electronic device establishes a network connection based on the client identification assembly information of the second electronic device, so that during the movement of the first electronic device and the second electronic device, as long as the distance between the first electronic device and the second electronic device is less than the first distance, the first electronic device can share the data flow of the second electronic device to realize the network connection.

In some embodiments of the present disclosure, the first connection assembly of the first electronic device establishing the network connection based on the client identification assembly information of the second electronic device includes the following. After obtaining the information of the client identification assembly of the second electronic device, the first connection assembly of the first electronic device automatically connects the first electronic device to the mobile network based on the client identification assembly information (SIM and APN) of the second electronic device. For example, after obtaining the SIM information of the second electronic device, based on the SIM information of the second electronic device, the WWAN assembly of the first electronic device configures the SIM information and corresponding APN in the first electronic device, and automatically connects the first electronic device to the mobile network.

According to the information processing method provided by the embodiment of the present disclosure, when the first electronic device shares the data flow of the second electronic device for the first time, in response to the distance between the first electronic device and the second electronic device being less than the first distance, the first electronic device can automatically share the data flow of the second electronic device to realize network connection with simple and fast operation. This method does not require inserting SIM card, and thus does not introduce new cost.

Figure 3:
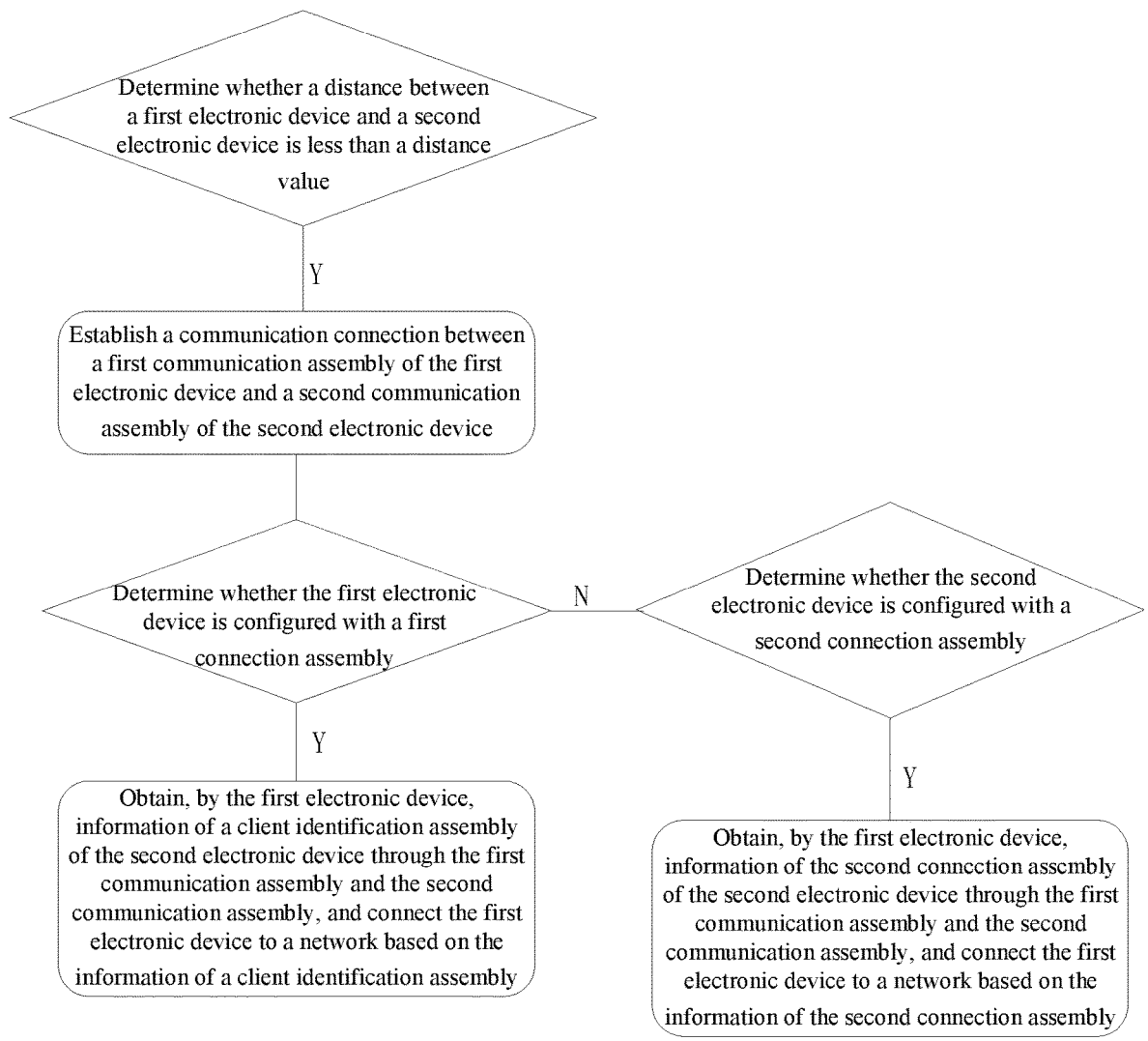
FIG. 3 is a flowchart of an information processing method according to some other embodiments of the present disclosure.

In some embodiments, as shown in FIG. 3, the first electronic device may not be configured with a first connection assembly, the second electronic device may be configured with a second connection assembly, and the first information is the information of the second connection assembly of the second electronic device. The first connection assembly is configured to enable the first electronic device to have the ability to connect to the network within the coverage of a cellular network. The second connection assembly is configured to convert data network signal received by the second electronic device to wireless network signal and transmit the wireless network signal.

In some embodiments, the first connection assembly may be a WWAN assembly of the first electronic device, and the second connection assembly may be a WIFI hotspot assembly of the second electronic device, which is not limited by the present disclosure. To simplify the description, the information processing method of the present disclosure is described below taking the WWAN assembly as the first connection assembly of the first electronic device and taking the WIFI hotspot assembly as second connection assembly of the second electronic device.

In some embodiments of the present disclosure, the first electronic device obtaining the first information of the second electronic device through the first communication assembly and the second communication assembly includes the following. If the second connection assembly of the second electronic device is turned on, the first electronic device obtains the information of the second connection assembly of the second electronic device through the first communication assembly and the second communication assembly. The first electronic device can establish network connection through the wireless network signal transmitted by the second connection assembly of the second electronic device.

In some embodiments, the first electronic device may not be configured with a WWAN assembly, and the second electronic device may be configured with a WIFI hotspot assembly. If the distance between the first electronic device and the second electronic device is smaller than the first distance, the NFC assembly of the first electronic device and the NFC assembly of the second electronic device establish a communication connection. If the WIFI hotspot assembly of the second electronic device is turned on, the first electronic device obtains the WIFI hotspot assembly information of the second electronic device through the NFC assembly of the first electronic device and the NFC assembly of the second electronic device, such that the first electronic device can establish network connection using the WIFI hotspot assembly of the second electronic device.

In some embodiment of the present disclosure, the method may further include the following. If the second connection assembly of the second electronic device is turned off, the first electronic device sends a prompt instruction to the second electronic device; in response to receiving the prompt information, the second electronic device outputs the prompt information. The prompt information is used to make the user confirm whether to turn on the second connection assembly of the second electronic device.

In some embodiments, the first electronic device may not be configured with a WWAN assembly, and the second electronic device may be configured with a WIFI hotspot assembly. If the distance between the first electronic device and the second electronic device is less than the first distance, the NFC assembly of the first electronic device and the NFC assembly of the second electronic device establish a communication connection. If the WIFI hotspot assembly of the second electronic device is detected to be turned off, the first electronic device sends a prompt instruction to the second electronic device. In response to receiving the prompt instruction, the second electronic device outputs the prompt instruction. The prompt instruction is used to make the user confirm whether to turn on the WIFI hotspot assembly of the second electronic device. In response to that the user confirms to turn on the WIFI hotspot assembly of the second electronic device, the second electronic device turns on the WIFI hotspot assembly. The first electronic device then obtains the WIFI hotspot assembly information of the second electronic device through the NFC assembly of the first electronic device and the NFC assembly of the second electronic device, so as to facilitate the first electronic device to receive the wireless signal transmitted by the WIFI hotspot assembly of the second electronic device and use the wireless signal for network connection. In response to that the user confirms not to turn on the WIFI hotspot assembly of the second electronic device, the second electronic device keeps the WIFI hotspot assembly thereof turned off, so that the user can control the status of the WIFI hotspot assembly of the second electronic device based on the user's own usage demands, thereby controlling the data usage of the first electronic device.

In some embodiments of the present disclosure, if the first electronic device obtains the information of the second connection assembly of the second electronic device through the first communication assembly of the first electronic device and the second communication assembly of the second electronic device, the information processing method of the present disclosure may further include the following.

A third connection assembly of the first electronic device establishes a network connection based on the information of the second connection assembly of the second electronic device, such that during the movement of the first electronic device and second electronic device, in response to that the distance between the first electronic device and the second electronic device is less than the first distance, the first electronic device can share data flow with second electronic device to realize network connection. The third connection assembly enables the first electronic device to employ radio frequency technology and electromagnetic waves to communicate in the air, the first electronic device can use the information of the second connection assembly of the second electronic device to connect to the network, thereby avoiding the heat generation and power consumption caused by the second electronic device sharing the second connection assembly.

In some embodiments of the present disclosure, the third connection assembly may be a wireless local area network (WLAN) assembly of the first electronic device, which is not limited by the present disclosure. In some other embodiments of the present disclosure, the third connection assembly may also be another assembly of the first electronic device, as long as the third connection assembly can enable the first electronic device to use radio frequency technology, use electromagnetic waves, and communicate in the air.

In some embodiments of the present disclosure, the third connection assembly of the first electronic device establishing a network connection based on the information of the second connection assembly of the second electronic device may include the following. After obtaining the information of the second connection assembly of the second electronic device by the third connection assembly, the first electronic device may be configured with the information of the second connection assembly to communicate with the second connection assembly of the second electronic device, so as to be paired with the second connection assembly of the second electronic device and automatically connect to the network. After the WLAN assembly of the first electronic device obtains the WIFI hotspot information of the electronic device, the first electronic device may be configured with the WIFI hotspot information of the second electronic device, may be paired with the WIFI hotspot of the second electronic device, and may automatically connect to the network.

According to the information processing method provided by these embodiments of the present disclosure, when the first electronic device shares the data flow of the second electronic device for the first time, in response to the distance between the first electronic device and the second electronic device being less than the first distance and the second connection assembly of the second electronic device is turned on, the first electronic device can automatically share the data flow of the second electronic device to realize network connection with simple and fast operation.

As the use of data flow becomes more and more popular, more and more attention is paid to network security. Some embodiments of the present disclosure provide an information processing method to improve the network security of the first electronic device and the second electronic device on the basis of ensuring that the first electronic device can share the data flow of the second electronic device. The first electronic device obtaining the first information of the second electronic device through the first communication assembly and the second communication assembly may include the following but is not limited by the present disclosure. The first electronic device may obtain encrypted first information of the second electronic device through the first communication assembly and the second communication assembly. The first electronic may decrypt the encrypted first information to obtain the first information.

According to the information processing method provided by the embodiment of the present disclosure, when the first electronic device shares the data flow of the second electronic device, in response to the distance between the first electronic device and the second electronic device being less than the first distance, the first electronic device can automatically share the data flow of the second electronic device to realize network connection with simple and fast operation.

Figure 4:
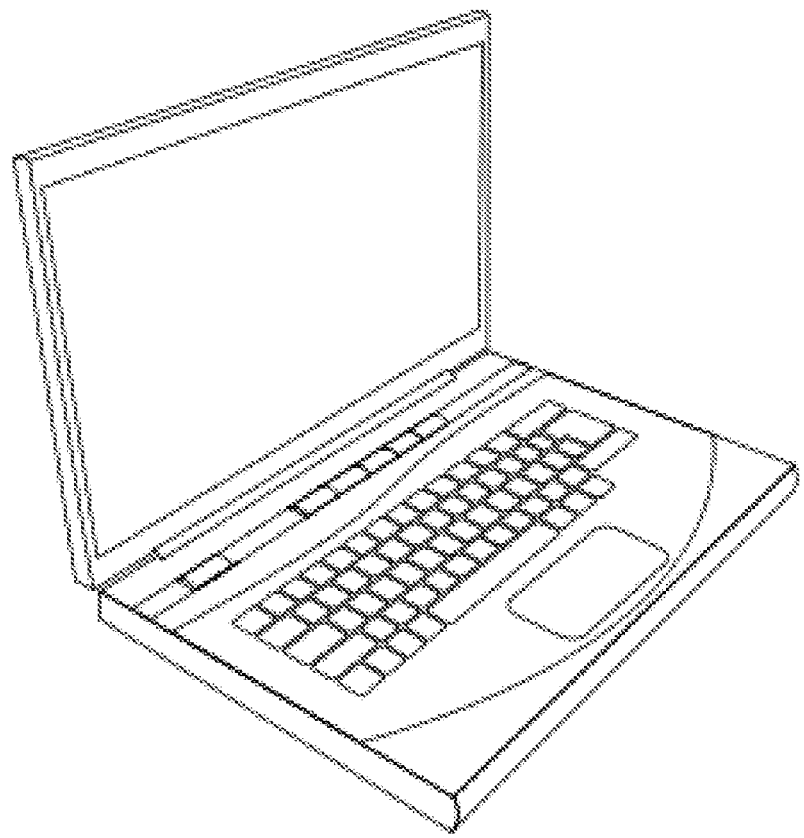
FIG. 4 is a schematic structural diagram of an electronic device according to some embodiments of the present disclosure.

Another aspect of the present disclosure also provides an electronic device. As shown in FIG. 4, the electronic device (e.g. a first electronic device) includes a first communication assembly and a processor, and the processor may be configured to execute to the following.

If a distance between a first electronic device and a second electronic device is less than a first distance, a first communication assembly of the first electronic device and a second communication assembly of the second electronic device are controlled to establish a communication connection. The first electronic device obtains first information of the second electronic device through the first communication assembly of the first electronic device and the second communication assembly of the second electronic device, and the first information is used by the first electronic device for connecting to the mobile network.

The first distance may be determined according to capability of establishing the connection between the first communication assembly of the first electronic device and the second communication assembly of the second electronic device. The present disclosure does not limit a value of the first distance. When the distance between the first electronic device and the second electronic device is less than the first distance, the first communication assembly of the first electronic device and the second communication assembly of the second electronic device establish a communication connection.

In some embodiments of the present disclosure, the second electronic device supports WWAN LTE and has data flow to realize network connection. In some embodiments, the second electronic device is externally inserted with a SIM card, and connects to a network by paying for Internet access charges of the SIM card.

Current electronic devices usually support a near-field communication (NFC) function. In some embodiments, the first electronic device may have an NFC assembly and the second electronic device may have an NFC assembly. The first NFC assembly may be the NFC assembly of the first electronic device and the second NFC assembly may be the NFC of the second electronic device. If a distance between a first electronic device and a second electronic device is less than a first distance, the NFC assembly of the first electronic device and the NFC assembly of the second electronic device establish a communication connection. The first electronic device obtains first information of the second electronic device through the NFC assembly of the first electronic device and the NFC assembly of the second electronic device, and the first information is used by the first electronic device for connecting to the mobile network.

In some embodiments, if the first electronic device has a first connection assembly, the first information is information of a client identification assembly of the second electronic device. The first connection assembly of the first electronic device enables the first electronic device to have the ability to connect the first electronic device to the mobile network within the coverage of a cellular network.

In some embodiments, the information of the client identification assembly of the second electronic device is the SIM card information of the second electronic device, which is not limited in the present disclosure. In some other embodiments of the present disclosure, if the second electronic device can also obtain data flow in other manners, the information of the client identification assembly of the second electronic device may be other information, which is not limited by the present disclosure. To simplify the description of the present disclosure, the electronic device provided by the present disclosure is described below, taking the SIM card information of the second electronic device as the client identification assembly information of the second electronic device.

In some embodiments of the present disclosure, the first connection assembly is the WWAN assembly of the first electronic device, which is not limited by the present disclosure. In other embodiments of the present disclosure, the first connection assembly may also be another assembly of the first electronic device. The first connection assembly of the first electronic device can enable the first electronic device to establish a network connection based on the information of the client identification assembly of the second electronic device.

In some embodiments of the present disclosure, the processor is further configured to: control the first connection assembly of the first electronic device to establish a network connection based on the client identification assembly information of the second electronic device, so that during the movement of the first electronic device and the second electronic device, as long as the distance between the first electronic device and the second electronic device is less than the first distance, the first electronic device can share the data flow of the second electronic device to realize the network connection.

In some embodiments of the present disclosure, to establish the network connection by the first communication assembly of the first electronic device based on the client identification assembly information of the second electronic device, the processor is further configured to: after obtaining the information of the client identification assembly of the second electronic device, control the first communication assembly of the first electronic device automatically to connect the first electronic device to the mobile network based on the client identification assembly information (SIM and APN) of the second electronic device. For example, after obtaining the SIM information of the second electronic device, based on the SIM information of the second electronic device, the WWAN assembly of the first electronic device configures the SIM information and corresponding APN in the first electronic device, and automatically connects the first electronic device to the mobile network.

Using the electronic device of the embodiments of the present disclosure, when the first electronic device shares the data flow of the second electronic device for the first time, in response to the distance between the first electronic device and the second electronic device being less than the first distance, the first electronic device can automatically share the data flow of the second electronic device to realize network connection with simple and fast operation. This electronic device does not require inserting SIM card, and thus does not introduce new cost.

In some embodiments, the first electronic device may not be configured with a first connection assembly, the second electronic device may be configured with a second connection assembly, and the first information is the information of the second connection assembly of the second electronic device. The first connection assembly is configured to enable the first electronic device to have the ability to connect to the network within the coverage of a cellular network. The second connection assembly is configured to convert data network signal received by the second electronic device to wireless network signal and transmit the wireless network signal.

In some embodiments, the first connection assembly may be a WWAN assembly of the first electronic device, and the second connection assembly may be a WIFI hotspot assembly of the second electronic device, which is not limited by the present disclosure. To simplify the description, the electronic device of the present disclosure is described below taking the WWAN assembly as the first connection assembly of the first electronic device and taking the WIFI hotspot assembly as second connection assembly of the second electronic device.

In some embodiments of the present disclosure, to obtain the first information of the second electronic device by the first electronic device through the first communication assembly and the second communication assembly, the processor is further configured to: if the second communication assembly of the second electronic device is turned on, control the first electronic device to obtain the information of the second connection assembly of the second electronic device through the first communication assembly and the second communication assembly. The first electronic device can establish network connection through the wireless network signal transmitted by the second connection assembly of the second electronic device.

In some embodiments, the first electronic device may not be configured with a WWAN assembly, and the second electronic device may be configured with a WIFI hotspot assembly. If the distance between the first electronic device and the second electronic device is smaller than the first distance, the NFC assembly of the first electronic device and the NFC assembly of the second electronic device establish a communication connection. If the WIFI hotspot assembly of the second electronic device is turned on, the first electronic device obtains the WIFI hotspot assembly information of the second electronic device through the NFC assembly of the first electronic device and the NFC assembly of the second electronic device, such that the first electronic device can establish network connection using the WIFI hotspot assembly of the second electronic device.

In some embodiment of the present disclosure, the processor is further configured to: if the second communication assembly of the second electronic device is turned off, control the first electronic device to send a prompt instruction to the second electronic device, to enable the second electronic device to output the prompt information in response to the prompt information. The prompt information is used to make the user confirm whether to turn on the second communication assembly of the second electronic device.

In some embodiments, the first electronic device may not be configured with a WWAN assembly, and the second electronic device may be configured with a WIFI hotspot assembly. If the distance between the first electronic device and the second electronic device is less than the first distance, the NFC assembly of the first electronic device and the NFC assembly of the second electronic device establish a communication connection. If the WIFI hotspot assembly of the second electronic device is detected to be turned off, the first electronic device sends a prompt instruction to the second electronic device. In response to receiving the prompt instruction, the second electronic device outputs the prompt instruction. The prompt instruction is used to make the user confirm whether to turn on the WIFI hotspot assembly of the second electronic device. In response to that the user confirms to turn on the WIFI hotspot assembly of the second electronic device, the second electronic device turns on the WIFI hotspot assembly. The first electronic device then obtains the WIFI hotspot assembly information of the second electronic device through the NFC assembly of the first electronic device and the NFC assembly of the second electronic device, so as to facilitate the first electronic device to receive the wireless signal transmitted by the WIFI hotspot assembly of the second electronic device and use the wireless signal for network connection. In response to that the user confirms not to turn on the WIFI hotspot assembly of the second electronic device, the second electronic device keeps the WIFI hotspot assembly thereof turned off, so that the user can control the status of the WIFI hotspot assembly of the second electronic device based on the user's own usage demands, thereby controlling the data usage of the first electronic device.

In some embodiments of the present disclosure, if the first electronic device obtains the information of the second connection assembly of the second electronic device through the first communication assembly of the first electronic device and the second communication assembly of the second electronic device, the processor of the electronic device is further configured to execute the following. A third connection assembly of the first electronic device is controlled to establish a network connection based on the information of the second connection assembly of the second electronic device, such that during the movement of the first electronic device and second electronic device, in response to that the distance between the first electronic device and the second electronic device is less than the first distance, the first electronic device can share data flow with second electronic device to realize network connection. The third connection assembly enables the first electronic device to employ radio frequency technology and electromagnetic waves to communicate in the air, the first electronic device can use the information of the second connection assembly of the second electronic device to connect to the network, thereby avoiding the heat generation and power consumption caused by the second electronic device sharing the second connection assembly.

In some embodiments of the present disclosure, the third connection assembly may be a wireless local area network (WLAN) assembly of the first electronic device, which is not limited by the present disclosure. In some other embodiments of the present disclosure, the third connection assembly may also be another assembly of the first electronic device, as long as the third connection assembly can enable the first electronic device to use radio frequency technology, use electromagnetic waves, and communicate in the air.

In some embodiments of the present disclosure, to control the third connection assembly of the first electronic device to establish a network connection based on the information of the second connection assembly of the second electronic device, the processor may be further configured to execute the following. After obtaining the information of the second connection assembly of the second electronic device by the third connection assembly, the first electronic device may be configured with the information of the second connection assembly to communicate with the second connection assembly of the second electronic device, so as to be paired with the second connection assembly of the second electronic device and automatically connect to the network. After the WLAN assembly of the first electronic device obtains the WIFI hotspot information of the electronic device, the first electronic device may be configured with the WIFI hotspot information of the second electronic device, may be paired with the WIFI hotspot of the second electronic device, and may automatically connect to the network.

Using the electronic device provided by these embodiments of the present disclosure, when the first electronic device shares the data flow of the second electronic device for the first time, in response to the distance between the first electronic device and the second electronic device being less than the first distance and the second connection assembly of the second electronic device is turned on, the first electronic device can automatically share the data flow of the second electronic device to realize network connection with simple and fast operation.

As the use of data flow becomes more and more popular, more and more attention is paid to network security. Some embodiments of the present disclosure provide an electronic device to improve the network security of the first electronic device and the second electronic device on the basis of ensuring that the first electronic device can share the data flow of the second electronic device. To control the first electronic device to obtain the first information of the second electronic device through the first communication assembly and the second communication assembly, the processor of the electronic device may be configured to execute the following. The first electronic device may obtain encrypted first information of the second electronic device through the first communication assembly and the second communication assembly. The first electronic may decrypt the encrypted first information to obtain the first information.

Using the electronic device provided by the embodiment of the present disclosure, when the first electronic device shares the data flow of the second electronic device, in response to the distance between the first electronic device and the second electronic device being less than the first distance, the first electronic device can automatically share the data flow of the second electronic device to realize network connection with simple and fast operation.

Embodiments of the present specification are described in a progressive manner, and each embodiment focuses on differences from other embodiments, and the same or similar parts between the various embodiments may be referred to each other.

The above description of the disclosed embodiments enables those skilled in the art to implement or use the disclosure. Various modifications to these disclosed embodiments are obvious to those skilled in the art, and the general principles defined herein may be implemented in other embodiments without departing from the spirit or scope of the disclosure. Therefore, the present disclosure is not limited to the embodiments disclosed herein, but the scope of the disclosure is to be accorded as the widest range consistent with the principles and novel features disclosed herein.

What is claimed is:

1. An information processing method, including:
    establishing, in response to a distance between a first electronic device having a first connection assembly and a second electronic device being less than a distance value, a communication connection between a first communication assembly of the first electronic device and a second communication assembly of the second electronic device;
    obtaining, by the first electronic device, information of the second electronic device, the information is of a client identification assembly of the second electronic device, through the first communication assembly and the second communication assembly; and
    connecting the first electronic device to a network based on the information, wherein, the first communication assembly is configured to enable the first electronic device to be connected to the network within a coverage of a cellular network.

2. The information processing method according to claim 1, further comprising:
    connecting, by the first connection assembly of the first electronic device, the first electronic device to the network based on the information of the client identification assembly of the second electronic device.

3. The information processing method according to claim 1, wherein:
    the first electronic device is not configured with a first connection assembly;
    the second electronic device is configured with a second connection assembly;
    the information is information of the second connection assembly of the second electronic device;
    the first connection assembly is configured to enable the first electronic device to be connected to the network within a coverage of a cellular network; and
    the second connection assembly is configured to convert data network signal received by the second electronic device into wireless signal and transmit the wireless signal.

4. The information processing method according to claim 3, wherein obtaining the information of the second electronic device through the first communication assembly and the second communication assembly includes:
    obtaining, by the first electronic device and in response to the second connection assembly of the second electronic device being turned on, the information of the second connection assembly of the second electronic device.

5. The information processing method according to claim 4, further comprising:
    sending, by the first electronic device and in response to the second connection assembly of the second electronic device being turned off, a prompt information to the second electronic device, wherein:
    the second electronic device is configured to output the prompt information in response to receiving the prompt information from the first electronic device; and
    the prompt information is configured to make a user to confirm whether to turn on the second connection assembly of the second electronic device.

6. The information processing method according to claim 3, further comprising:
connecting, by a third connection assembly of the first electronic device, the first electronic device to the network based on the information of the second connection assembly of the second electronic device,
wherein the third connection assembly is configured to enable the first electronic device to use radio frequency technology and electromagnetic waves to perform communication connections in air.

7. The information processing method according to claim 1, wherein obtaining the information of the second electronic device includes include:
obtaining, by the first electronic device, encrypted information of the second electronic device from the second electronic device; and
decrypting, by the first electronic device, the encrypted information to obtain the information of the second electronic device.

8. An electronic device comprising:
A first communication assembly; and
a processor configured to:
establish, in response to a distance between the electronic device having a first connection assembly and another electronic device being less than a distance value, a communication connection between the first communication assembly of the electronic device and a second communication assembly of the another electronic device;
obtain, through the first communication assembly and the second communication assembly, information of the another electronic device, the information is of a client identification assembly of the another electronic device; and
connect the electronic device to a network based on the information, wherein,
the first communication assembly is configured to enable the first electronic device to be connected to the network within a coverage of a cellular network.

9. The electronic device according to claim 8, wherein the processor is further configured to:
connect, by the first connection assembly of the electronic device, the electronic device to the network based on the information of the client identification assembly of the second electronic device.

10. The electronic device according to claim 8, wherein:
the electronic device is not configured with a first connection assembly;
the another electronic device is configured with a second connection assembly;
the information is information of the second connection assembly of the another electronic device;
the first connection assembly is configured to enable the electronic device to be connected to the network within a coverage of a cellular network; and
the second connection assembly is configured to convert data network signal received by the another electronic device into wireless signal and transmit the wireless signal.

11. The electronic device according to claim 10, wherein the processor is further configured to:
obtain, in response to the second connection assembly being turned on, the information of the second connection assembly of the another electronic device.

12. The electronic device according to claim 11, wherein the processor is further configured to:
sending, in response to the second connection assembly being turned off, a prompt information to the another electronic device, wherein:
the another electronic device is configured to output the prompt information in response to receiving the prompt information from the electronic device; and
the prompt information is configured to make a user to confirm whether to turn on the second connection assembly of the another electronic device.

13. The electronic device according to claim 10, wherein the processor is further configured to:
connect, by a third connection assembly of the electronic device, the electronic device to the network based on the information of the second connection assembly of the another electronic device,
wherein the third connection assembly is configured to enable the electronic device to use radio frequency technology and electromagnetic waves to perform communication connections in air.

14. The electronic device according to claim 8, wherein the processor is further configured to:
obtain encrypted information of the another electronic device from the another electronic device; and
decrypt the encrypted information to obtain the information of the another electronic device.

15. A non-transitory computer readable storage medium storing a computer program, wherein the computer program is executed by a processor to implement an information processing method, the method comprising:
establishing, in response to a distance between a first electronic device having a first connection assembly and a second electronic device being less than a distance value, a communication connection between a first communication assembly of the first electronic device and a second communication assembly of the second electronic device;
obtaining, by the first electronic device, information of the second electronic device, the information is of a client identification assembly of the second electronic device, through the first communication assembly and the second communication assembly; and
connecting the first electronic device to a network based on the information, wherein, the first communication assembly is configured to enable the first electronic device to be connected to the network within a coverage of a cellular network.

16. The non-transitory computer readable storage medium according to claim 15, the method further comprising:
connecting, by the first connection assembly of the first electronic device, the first electronic device to the network based on the information of the client identification assembly of the second electronic device.

17. The non-transitory computer readable storage medium according to claim 15, wherein:
the first electronic device is not configured with a first connection assembly;
the second electronic device is configured with a second connection assembly;
the information is information of the second connection assembly of the second electronic device;
the first connection assembly is configured to enable the first electronic device to be connected to the network within a coverage of a cellular network; and
the second connection assembly is configured to convert data network signal received by the second electronic device into wireless signal and transmit the wireless signal.

* * * * *